UNITED STATES PATENT OFFICE 2,187,565

SYNTHETIC RESIN

Herman A. Bruson and John W. Eastes, Philadelphia, Pa., assignors to The Resinous Products & Chemical Company, Philadelphia, Pa.

No Drawing. Application April 30, 1938,
Serial No. 205,242

10 Claims. (Cl. 260—63)

This invention relates to new synthetic resins and a process for preparing same.

We have found that resins are formed by heating, at esterification temperature, ketonic compounds which, in the acidic form, have the general formula $$HOOC-R-CO-R'-O-A-X$$

wherein R is any divalent aliphatic or aromatic group having at least two carbon atoms, R' is any arylene radical, A is any alkylene or polyalkylene ether radical having at least two carbon atoms in each alkylene group, and X is a member of the group consisting of OH, O-acyl, and halogen.

Typical specific examples of this type are the following:

(a) $NaOOC-CH_2CH_2CO-C_6H_4-O-CH_2CH_2-O-CH_2CH_2Cl$ (b) $HOOC-CH=CH-CO-C_6H_4-O-CH_2CH_2OH$ (c) $HOOC-CH_2-CH_2-CO-C_6H_4-O-CH_2CH_2-O-CH_2CH_2OH$ (d) $HOOC-CH_2CH_2-CO-C_6H_4-O-CH_2CH_2-O-CH_2CH_2-O-CH_2CH_2OH$ (e) 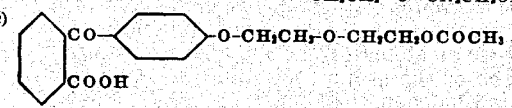

(f) 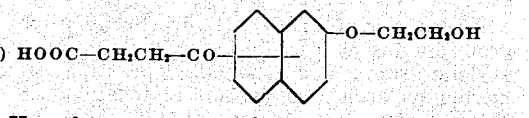

(g) $HOOC-CH_2CH_2-CO-$ 

Homologous compounds in which the aromatic group R' is substituted by inert atoms or groups such as chlorine and the higher alkyl groups or in which the alkylene group or groups of A contain a greater number of carbon atoms, such as the propylene, butylene, etc. groups are not as economical as the aforementioned but may be used in place of them.

Acids of this type are obtained by condensing aromatic alkylene ether esters of organic or inorganic acids in the presence of Friedel-Crafts type of condensing agents with anhydrides of organic dicarboxylic acids. Many of these are described in our copending application, Serial No. 135,672 filed April 8, 1937, Patent No. 2,132,675.

Essential for the resin formation are the two dissimilar combining groups which, upon the application of heat, eliminate water, metal halide, or volatile acid, etc. depending upon whether X is OH, halogen, or —O—acyl, by inter- or intramolecular esterification.

In order to illustrate this invention, the following examples are given—

Example 1.—β-chloroethoxyethoxybenzoyl-o-benzoic acid (prepared by condensing β-phenoxy-β'-chlorodiethyl ether in the presence of AlCl₃ with phthalic anhydride, and which is a crystalline compound, M. P. 123-24° C.), was neutralized with an aqueous 2% solution of sodium hydroxide and the clear solution of the sodium salt thus obtained heated in a sealed tube at 150–200° C. for six hours. A hard, colorless, chloroform-soluble resin was obtained, which separated from the aqueous solution of sodium chloride thus formed. The resin was soluble in acetone or ethylene dichloride, but was insoluble in hydrocarbons or alcohol.

A similar resin is obtained by fusing the above dried sodium salt in the absence of solvent at 200° C. for six hours, and subsequently washing out the NaCl.

Example 2.—To a well stirred mixture of 49 g. of phthalic anhydride, 50 g. AlCl₃, and 250 cc. of carbon disulfide, there was gradually added 75 g. of β-phenoxyethoxyethyl acetate, $C_6H_5OC_2H_4OC_2H_4OCOCH_3$, and the mixture then heated on the steam bath until HCl evolution ceased. Upon hydrolysis with cold, dilute hydrochloric acid and removal of the CS₂, a viscous oil was obtained which was purified by dissolving in cold, dilute soda solution, and precipitating the filtered solution with dilute hydrochloric acid. The product separated as a pale yellow, viscous oil which analyzed correctly for a substance having the formula—

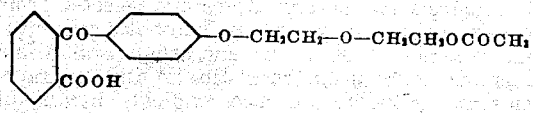

Upon heating this substance at 190–220° C. for several hours, acetic acid was evolved and a hard-brittle resin obtained.

Example 3.—In place of the above acetate, the corresponding alcohol may be used, which is obtained by saponifying the acetyl group with aqueous caustic soda solution. This substance has the formula—

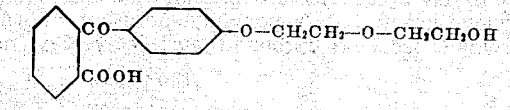

and rapidly forms a hard, brittle resin when heated at 165–180° C. for several hours until water is no further evolved.

*Example 4.*—The condensation product of succinic anhydride and AlCl₃ with β-phenoxyethoxyethyl acetate, having the formula

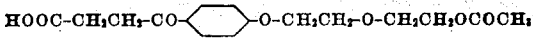

was heated at 185° C. for three hours. A hard, tough resin was obtained.

In a similar manner, any homologues of these materials having the aforementioned general formula, may be used in the manner indicated to form resins. Various modifying agents may be present during the internal esterification which forms the resin. Typical modifying agents are other alcohols, acids, or esters, among which may be mentioned rosin, phenolic-formaldehyde condensates, fatty oils of the drying, non-drying, or semi-drying type, or their fatty acids, polybasic organic acids, and polyhydric alcohols of all types.

What we claim is:

1. A resin derived by heating at esterification temperature a member of the group consisting of ketonic acids and their salts, having in their acidic form the formula—

HOOC—R—CO—R'—O—A—X wherein R is a divalent hydrocarbon group having at least two carbon atoms selected from the group consisting of the aliphatic and aromatic series, R' is an arylene group, A is a member of the group consisting of alkylene radicals and polyalkylene ether radicals, having at least two carbon atoms in each alkylene group, and X is one of the group consisting of —OH, —O—acyl, and halogen.

2. A resin derived by heating at esterification temperature, a compound having the general formula—

HOOC—R—CO—R'—O—A—OH wherein R is a divalent hydrocarbon group having at least two carbon atoms and selected from the group consisting of the aliphatic and aromatic series, R' is an arylene group, and A is a member of the group consisting of alkylene radicals and polyalkylene ether radicals, having at least two carbon atoms in each alkylene group.

3. A resin derived by heating at esterification temperature, a compound having the general formula—

NaOOC—R—CO—R'—O—A—Cl wherein R is a divalent hydrocarbon group having at least two carbon atoms and selected from the group consisting of the aliphatic and aromatic series, R' is an arylene group, and A is a member of the group consisting of alkylene radicals and polyalkylene ether radicals, having at least two carbon atoms in each alkylene group.

4. A resin derived by heating at esterification temperature a member of the group consisting of ketonic acids and their salts, having in their acidic form the formula—

HOOC—R—CO—R'—O—A—X wherein R is a divalent aliphatic hydrocarbon group having at least two carbon atoms, R' is an arylene group, A is a polyalkylene ether radical having at least two carbon atoms in each alkylene group, and X is one of the group consisting of OH, —O—acyl, and halogen.

5. A resin derived by heating at esterification temperature a member of the group consisting of ketonic acids and their salts, having in their acidic form the formula—

HOOC—R—CO—R'—O—A—X wherein R is a divalent aromatic hydrocarbon group having at least two carbon atoms, R' is an arylene group, A is a polyalkylene ether radical having at least two carbon atoms in each alkylene group, and X is one of the group consisting of OH, —O—acyl, and halogen.

6. A resin derived by heating at esterification temperature a member of the group consisting of ketonic acids and their salts, having in their acidic form the formula—

7. A resin derived by heating at esterification temperature a member of the group consisting of ketonic acids and their salts, having in their acidic form the formula—

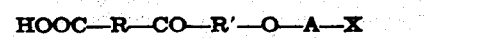

8. A process for preparing a resin which comprises heating a member of the group consisting of ketonic acids and their salts, having in their acidic form the formula—

HOOC—R—CO—R'—O—A—X wherein R is a divalent hydrocarbon group having at least two carbon atoms selected from the group consisting of the aliphatic and aromatic series, R' is an arylene group, A is a member of the group consisting of alkylene radicals and polyalkylene ether radicals, having at least two carbon atoms in each alkylene group, and X is one of the group consisting of —OH, —O—acyl, and halogen.

9. A process for preparing a resin which comprises heating a member of the group consisting of ketonic acids and their salts, having in their acid form the formula—

HOOC—R—CO—R'—O—A—X wherein R is a divalent hydrocarbon aliphatic group having at least two carbon atoms, R' is an arylene group, A is a polyalkylene ether radical having at least two carbon atoms in each alkylene group, and X is one of the group consisting of OH, —O—acyl, and halogen.

10. A process for preparing a resin which comprises heating a member of the group consisting of ketonic acids and their salts, having in their acidic form the formula—

HOOC—R—CO—R'—O—A—X wherein R is a divalent aromatic hydrocarbon group having at least two carbon atoms, R' is an arylene group, A is a polyalkylene ether radical having at least two carbon atoms in each alkylene group, and X is one of the group consisting of OH, —O—acyl, and halogen.

HERMAN A. BRUSON.
JOHN W. EASTES.